United States Patent
Matsumoto

(10) Patent No.: US 10,500,901 B2
(45) Date of Patent: Dec. 10, 2019

(54) MOTORCYCLE PNEUMATIC TIRE

(71) Applicant: SUMITOMO RUBBER INDUSTRIES, LTD., Kobe-shi, Hyogo (JP)

(72) Inventor: Takuro Matsumoto, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 478 days.

(21) Appl. No.: 15/131,789

(22) Filed: Apr. 18, 2016

(65) Prior Publication Data
US 2016/0318350 A1 Nov. 3, 2016

(30) Foreign Application Priority Data
May 1, 2015 (JP) .................................. 2015-093782

(51) Int. Cl.
*B60C 11/03* (2006.01)
*B60C 11/117* (2006.01)

(52) U.S. Cl.
CPC ......... *B60C 11/032* (2013.01); *B60C 11/0302* (2013.01); *B60C 2011/0334* (2013.01);
(Continued)

(58) Field of Classification Search
CPC ............. B60C 11/0311; B60C 11/032; B60C 11/0323; B60C 2011/0381; B60C 2200/10
See application file for complete search history.

(56) References Cited

U.S. PATENT DOCUMENTS

| 2005/0115653 A1* | 6/2005 | Miyasaka | ........... B60C 11/0302 152/209.1 |
| 2009/0308515 A1* | 12/2009 | Matsunaga | ......... B60C 11/0302 152/209.18 |

(Continued)

FOREIGN PATENT DOCUMENTS

| EP | 0368553 A2 * | 5/1990 | ......... B60C 11/0306 |
| JP | 2-133206 A | 5/1990 | |

(Continued)

OTHER PUBLICATIONS

Machine Translation: JP-2012131377-A; Saiwaki, Izumi; (Year: 2018).*

(Continued)

*Primary Examiner* — Kendra Ly
(74) *Attorney, Agent, or Firm* — Birch, Stewart, Kolasch & Birch, LLP

(57) ABSTRACT

A motorcycle pneumatic tire includes a tread portion including a crown region, a pair of middle regions and a pair of shoulder regions upon a tread development width of the tread portion being divided equally into five regions. The tread portion is provided with a pair of circumferentially and continuously extending crown main grooves within the crown region to include a tire equator therebetween and a plurality of inclined grooves each extending from the crown region to the shoulder region in each side of the tire equator without communicating with the crown main grooves. Each of the inclined grooves includes a straight portion extending straightly in the middle region and an arc portion extending in an arc shape in the shoulder region while increasing an angle with respect to a circumferential direction of the tire axially outwardly.

10 Claims, 6 Drawing Sheets

(52) U.S. Cl.
CPC ............. *B60C 2011/0341* (2013.01); *B60C 2011/0372* (2013.01); *B60C 2011/0374* (2013.01)

(56) References Cited

U.S. PATENT DOCUMENTS

| | | | |
|---|---|---|---|
| 2010/0147427 A1* | 6/2010 | Ishiyama | B60C 11/0309 152/209.25 |
| 2014/0102608 A1* | 4/2014 | Kato | B60C 11/0302 152/209.8 |

FOREIGN PATENT DOCUMENTS

| JP | 05201207 A | * | 8/1993 | ......... B60C 11/0302 |
|---|---|---|---|---|
| JP | 2007-99147 A | | 4/2007 | |
| JP | 2008-168703 A | | 7/2008 | |
| JP | 2008168703 A | * | 7/2008 | ......... B60C 11/0302 |
| JP | 2012131377 A | * | 7/2012 | |
| JP | 2015116844 A | * | 6/2015 | |

OTHER PUBLICATIONS

Machine Translation: JP-05201207-A; Kajimoto, Katsuhiko; (Year: 2019).*

Machine Translation: JP-2015116844-A; Takeuchi Hirofumi; (Year: 2019).*

Machine Translation: JP-2008168703-A; Terada, Koji; (Year: 2019).*

Continental, "Motorcycle Tires & Scooter Tires; Delivery Range 2013," Dec. 2, 2013, retrieved from http://www.dackstallet.com/filer/Conti_Delivery_Range_2013.pdf, 32 pages.

Extended European Search Report, dated Sep. 27, 2016, for European Application No. 16165471.0.

* cited by examiner

MOTORCYCLE PNEUMATIC TIRE

BACKGROUND ART

Field of the Invention

The present invention relates to motorcycle pneumatic tires, and in particular to a motorcycle pneumatic tire capable of improving wet and dry performance.

Description of the Related Art

Japanese Unexamined Patent Application Publication No. 2008-168703 discloses a motorcycle tire including a tread portion provided with a plurality of inclined grooves relative to the circumferential direction of the tire. In order to improve wet performance, i.e., a roadholding ability of a tire on a wet surface, it is preferable that the inclined grooves have large volume to disperse water.

Unfortunately, since such a motorcycle tire causes reduction of a ground contact area and stiffness of the tread portion, the grip performance on dry tends to be deteriorated.

SUMMARY OF THE INVENTION

In view of the above problems in the conventional art, the present invention has an object to provide a motorcycle pneumatic tire capable of improving wet and dry performance.

According to one aspect of the invention, a motorcycle pneumatic tire including a tread portion including a crown region, a pair of middle regions and a pair of shoulder regions upon a tread development width of the tread portion being divided equally into five regions. The tread portion is provided with at least a pair of circumferentially and continuously extending crown main grooves within the crown region to include a tire equator therebetween and a plurality of inclined grooves each extending from the crown region to the shoulder region in each side of the tire equator without communicating with the crown main grooves. Each of the inclined grooves includes a straight portion extending straightly in the middle region and an arc portion extending in an arc shape in the shoulder region while increasing an angle with respect to a circumferential direction of the tire axially outwardly.

In another aspect of the invention, a shoulder sub-groove may be provided between a pair of circumferentially adjacent inclined grooves in each shoulder region, and the shoulder sub-groove may have both ends terminating within the shoulder region.

In another aspect of the invention, the shoulder sub-groove may extend in an arc manner along one of the arc portions of the inclined grooves.

In another aspect of the invention, a middle land portion may be defined between straight portions of a pair of circumferentially adjacent inclined grooves in each middle region, and a width of the middle land portion in a direction perpendicular to the straight portions may be in a range of from 115% to 165% of a width of the straight portions.

In another aspect of the invention, a shoulder land portion may be defined between arc portions of a pair of circumferentially adjacent inclined grooves in each the shoulder region, and a circumferential length of the shoulder land portion may increase toward a tread edge.

In another aspect of the invention, each of the inclined grooves includes a first groove edge extending in a straight shape with an inclination, a second groove edge facing the first groove edge and a third groove edge forming an axially inner end of the inclined groove, and the third edge may extend in a straight shape along the circumferential direction of the tire.

In another aspect of the invention, the second groove edge may intersect with the third groove edge in an acute angle, and an axially inner portion of the second groove edge extends in an arc manner with an angle with respect to the circumferential direction of the tire increasing toward the third edge.

In another aspect of the invention, a circumferential length of the third groove edge may be greater than a width of the straight portion in each inclined groove.

In another aspect of the invention, the circumferential length of the third groove edge may be in a range of from 2.5 to 4.5 times of a width of the straight portion.

DESCRIPTION OF THE PREFERRED EMBODIMENTS

An embodiment of the present invention will be explained below with reference to the accompanying drawings.

Figure 1:
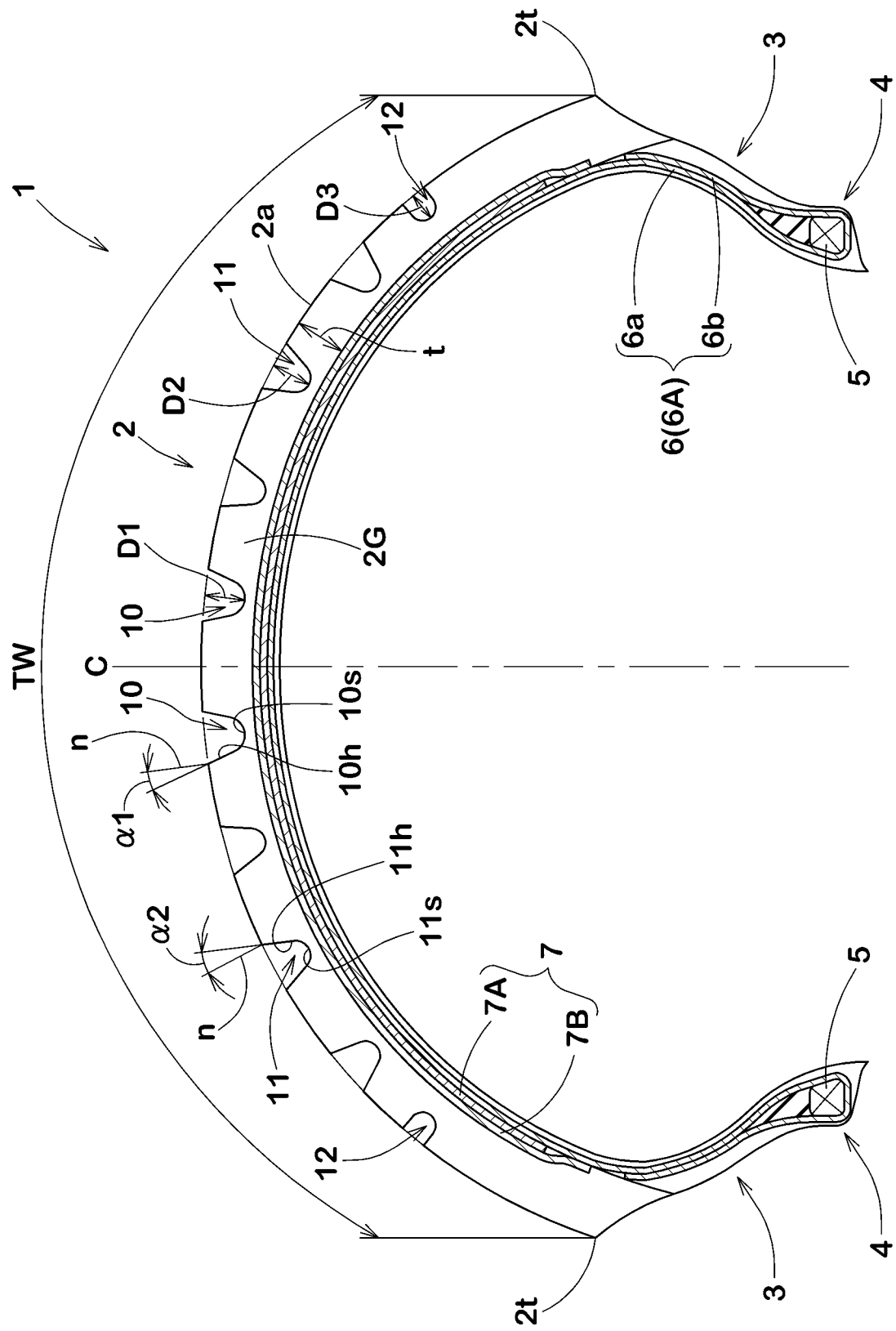
FIG. 1 is a cross-sectional view of a motorcycle pneumatic tire according to an embodiment of the present invention.

FIG. 1 is a cross-sectional view of a motorcycle pneumatic tire 1 placed under a standard condition according to an embodiment of the present invention. FIG. 1 is the cross-sectional view taken along a line X-X of FIG. 2.

As used herein, the standard condition is such that the tire 1 is mounted on a standard wheel rim with a standard pressure, but is loaded with no tire load. Unless otherwise noted, dimensions of respective portions of the tire 1 are values specified in the standard condition.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As illustrated in FIG. 1, the tire 1 in accordance with the present embodiment includes a carcass 6 extending between bead cores 5 in bead portions 4 through a tread portion 2 and a pair of sidewall portions 3, and a tread reinforcing layer 7 disposed radially outward of the carcass 6 in the tread portion 2.

The outer surface 2a of the tread portion 2 between tread edges 2t and 2t is configured as an arc shape that protrudes radially outwardly to obtain sufficient ground contact area even during cornering with a large camber angle. A development length of the outer surface 2a of the tread portion 2 between tread edges 2t and 2t is defined as the tread development width TW.

The carcass 6, for example, includes a single carcass ply 6A. The carcass ply 6A includes a main portion 6a extending between the bead cores 5 of the bed portions 4 through the tread portion 2 and the sidewall portions 3, and a pair of turn-up portions 6b each turned up around the bead core 5.

The tread reinforcing layer 7, for example, includes at least one, two in this embodiment, belt ply 7A and 7B of a steel cord oriented at angle of from 5 to 40 degrees with respect to the tire equator C. A tread rubber 2G that forms the outer surface 2a of the tire 1 is disposed on the tread reinforcing layer 7.

Figure 2:
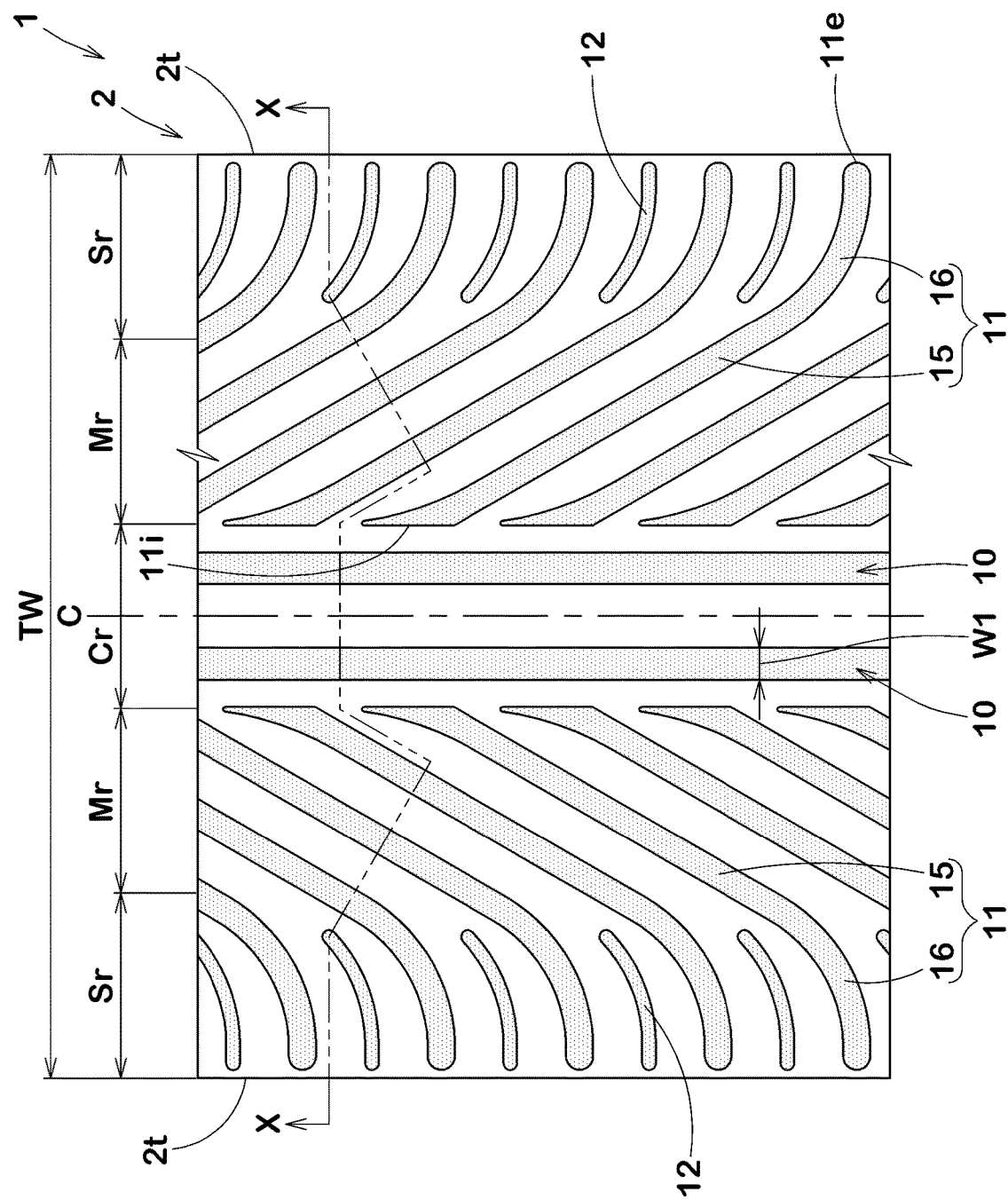
FIG. 2 is a development view of a tread portion of the motorcycle pneumatic tire of FIG. 1.

FIG. 2 illustrates a development view of the tread portion 2 of the tire 1 in accordance with the present embodiment. The tread portion 2 includes a crown region Cr, a pair of middle regions Mr and a pair of shoulder regions Sr, when the tread development width TW of the tread portion 2 is equally divided into five regions.

In this embodiment, the tread portion 2 is provided with a pair of crown main grooves 10, a plurality of inclined grooves 11 and a plurality of shoulder sub-grooves 12.

The crown main grooves 10 in accordance with the present embodiment extend continuously in the circumferential direction of the tire within the crown region Cr so as to include the tire equator C therebetween. The crown main grooves 10 may smoothly disperse water backwardly of the tread portion 2 using a large ground contact pressure of the tread portion 2 when traveling straight ahead. Furthermore, since the crown main grooves 10 are not provided on the tire equator C where the largest ground contact pressure tends to act, the crown region Cr may be maintained in high stiffness. In view of improving drainage performance when traveling straight ahead, four crown main grooves 10 may be provided within the crown region Cr except on the tire equator C.

The crown main grooves 10, for example, extend in a straight shape. This gives the crown region Cr high stiffness and better grip on dry condition. The crown main grooves 10 are not limited to the aspect above, but may alternatively extend in a zigzag or wavy shape, for example.

Preferably, the crown main grooves 10, for example, have a width W1 in a range of from 2.8% to 4.8% of the tread development width TW in order to ensure the drainage performance as well as dry grip performance of the tire.

As illustrated in FIG. 1, each of the crown main grooves 10 includes a bottom 10s and a pair of groove walls 10h each extending from each end of the bottom 10s toward the ground contact surface of the tread portion 2. Preferably, the groove walls 10h have an angle α1 in a range of from 14 to 28 degrees with respect to a tread normal line n, in order to ensure a sufficient groove volume during traveling and stiffness of the crown region.

Figure 3:
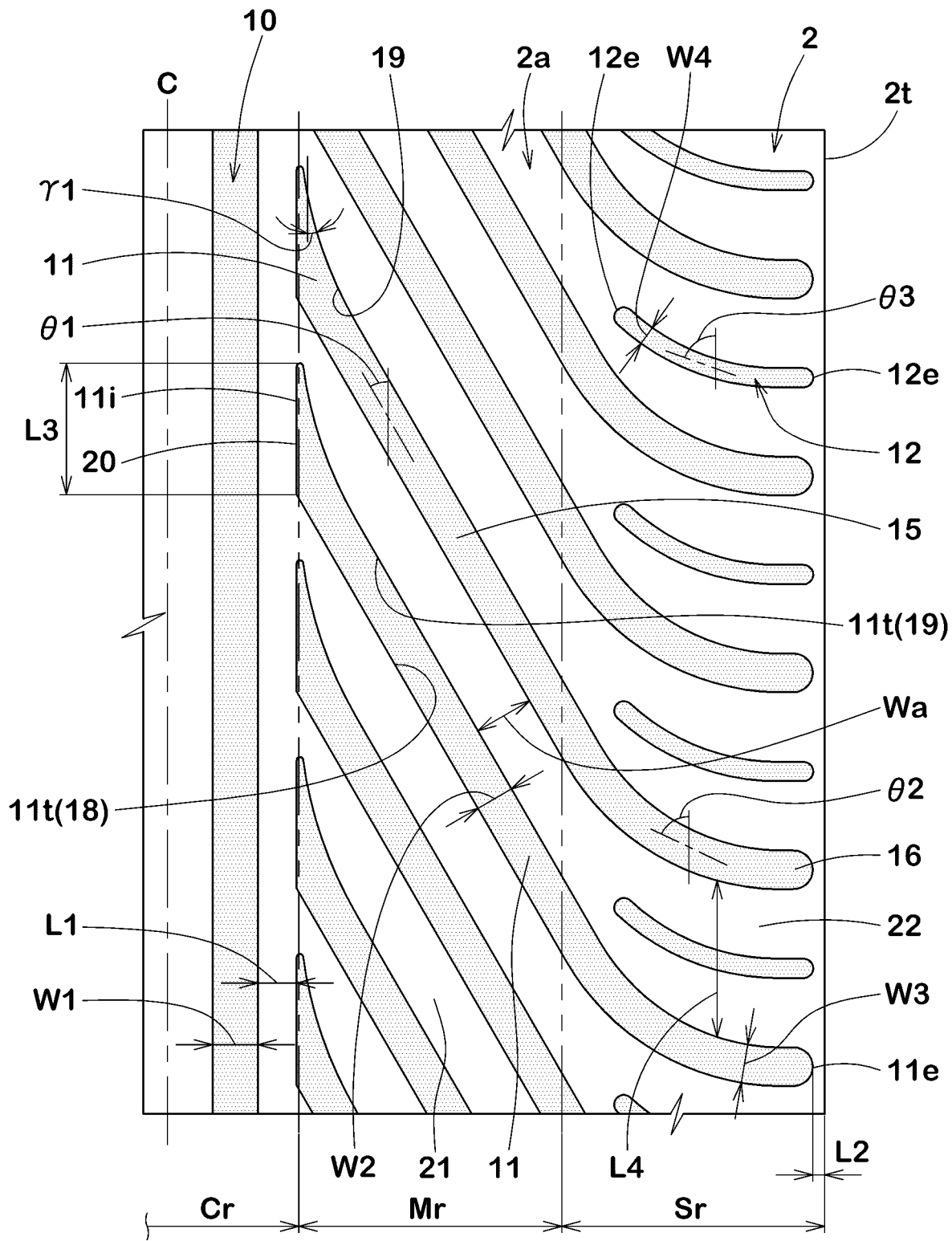
FIG. 3 is an enlarged view of the right side of the tread portion illustrated in FIG. 2.

As illustrated in FIG. 3, each of the inclined grooves 11 includes an axially inner end 11i and an axially outer end 11e. The inner end 11i is located within the crown region Cr without being communicated with the crown main grooves 10. The outer end 11e is located in the shoulder region Sr. The inclined grooves 11 may effectively disperse the water between the tread portion 2 and the ground contact surface during cornering to improve wet performance. Furthermore, since the inclined grooves 11 are not in communication with the crown main grooves 10 nor the tread edge 2t, the crown region Cr and the shoulder region Sr may have high stiffness. Thus, dry grip performance during traveling straight ahead and cornering can be improved.

Preferably, a minimum axial distance L1 between the inner ends 11i of the inclined grooves 11 and the crown main groove 10 is in a range of from 1% to 5% of the tread development width TW. When the distance L1 is less than 1% of the tread development width TW, dry grip performance during traveling straight ahead may be deteriorated due to reduction of stiffness of the crown region Cr. When the distance L1 is more than 5% of the tread development width TW, it may be difficult to disperse the water sufficiently from between the ground contact surface of the crown region Cr and the ground.

Preferably, an axial distance L2 between the outer ends 11e of the inclined grooves 11 and the tread edge 2t is smaller than the axial distance L1 between the inner ends 11i of the inclined grooves 11 and the crown main groove, in order to ensure a sufficient length of the inclined grooves 11 while improving dry grip performance. More preferably, the axial distance L2, for example, is of from 0.5% to 2% of the tread development width TW.

Each of the inclined grooves 11 includes a straight portion 15 extending straightly in the middle region Mr and an arc portion 16 extending in an arc shape in the shoulder region Sr while increasing an angle θ2 with respect to the circumferential direction of the tire axially outwardly. The straight portion 15 may increase stiffness in both axial and circumferential directions of the middle region Mr, which is subjected to lateral and longitudinal force, in good balance. Furthermore, the arc portion 16 may effectively increase lateral stiffness of the shoulder portion Sr which is a region subjected to a large lateral force as compared with the middle region Mr. Thus, the inclined grooves 11 may give proper stiffness to the respective middle region Mr and the shoulder region Sr. In addition, the inclined grooves 11 may smoothly disperse water outward of the tire using a lateral force and ground contact pressure acted on the middle region Mr and the shoulder region Sr when cornering. Thus, the tire according to the embodiment can improve both wet and dry performance. In this embodiment, each of the straight portions 15 of the inclined grooves 11 includes a pair of groove edges 11t and 11t extending in a straight shape. Alternatively, the straight portion 15 may be formed such that at least one of the groove edges 11t extends in a straight shape but the other groove edge 11t extends in a non-straight shape.

In this embodiment, the straight portions 15 extend from the crown region Cr to the shoulder region Sr in the axial direction. Thus, the middle region Mr may disperse water effectively to further improve wet performance of the tire, particularly to improve wet performance of the tire during cornering at a small camber angle.

Preferably, the straight portions 15 have an angle θ1 in a range of from 20 to 40 degrees with respect to the circumferential direction of the tire. When the angle θ1 of the straight portions 15 is less than 20 degrees, the wet and dry performance may be deteriorated due to reduction of stiffness of the middle region Mr in the axial direction. When the angle θ1 of the straight portions 15 is more than 40 degrees, wet and dry performance may be deteriorated due to reduction of stiffness of the middle region Mr in the circumferential direction.

Preferably, the width W2 of the straight portions 15 is in a range of from 2.3% to 3.7% of the tread development width TW, in order to further improve wet and dry performance.

The arc portions 16 are connected to the straight portions 15 smoothly. The arc portions 16 may be useful to reduce local stiffness difference of the tread portion 2 as well as drainage resistance to improve dry and wet performance.

Preferably, the arc portions 16 have a width W3 in a range of from 2.3% to 3.7% of the tread development width TW, and more preferably the width W2 is substantially equal to the width of the straight portions 15. Thus, the drainage performance through the arc portions 16 can be improved while ensuring a sufficient stiffness of the shoulder region Sr. In order to further improve the above effect, the angle θ2 of the arc portions 16 at the outer ends 11e is preferably in a range of not less than 80 degrees.

Each of the inclined grooves 11 includes a first groove edge 18 extending in a straight shape with an inclination, a second groove edge 19 facing the first groove edge 18 and a third groove edge 20 forming the axially inner end 11i of the inclined groove 11. The third groove edge 20 is located within the crown region Cr.

The first groove edge 18 in accordance with the present embodiment forms the below side groove edge of each inclined groove 11 in FIG. 3. The first groove edge 18 is intersects with the third groove edge 20 in an obtuse angle.

The second groove edge 19 in accordance with the present embodiment forms the above side groove edge of each inclined groove 11 in FIG. 3. The second groove edge 19 is intersects with the third groove edge 20 in an acute angle. The axially inner portion of the second groove edge 19 extends in an arc manner with an angle γ1 with respect to the circumferential direction of the tire, and the angle γ1 increases toward the third groove edge 20. Such a configuration may be helpful to increase a groove volume of the inclined groove 11. Furthermore, since the second groove edge 19 offers the inclined groove 11 having a circumferential width increasing toward the tire equator C, the drainage performance around the tire equator C can further be improved.

The third groove edge 20 extends in a straight shape along the circumferential direction of the tire. The third groove edge 20 may improve dry grip performance when traveling straight ahead by ensuring circumferential stiffness of the crown region Cr.

Preferably, the circumferential length L3 of the third groove edge 20 is greater than the width W2 of the straight portion 15 in each inclined groove 11. Thus, drainage performance on the crown region Cr can further be improved. In view of the above, the length L3 of the third groove edge 20 is preferably in a range of from 2.5 to 4.5 times the width W2 of the straight portion 15. With this, the drainage performance on the crown region Cr can further be improved while ensuring dry grip performance when traveling straight ahead.

As described above, the tire 1 in accordance with the present embodiment may give the crown region Cr, the middle regions Mr and the shoulder regions Sr proper stiffness according to the ground contact pressure and the lateral force acting on the respective regions. Accordingly, the tire 1 may improve wet and dry performance when not only traveling straight ahead but cornering at a large camber angle.

As illustrated in FIG. 1, the inclined groove 11, same as the crown main grooves 10, includes a bottom 11s and a pair of groove walls 11h each extending from each end of the bottom 11s toward the ground contact surface of the tread portion 2. The angle α2 of the groove walls 11h of the inclined groove 11, same as the angle α1 of the groove walls 10h of the crown main grooves 10, is preferably in a range of from 14 to 28 degrees with respect to the tread normal line n. The depths D2 of the inclined grooves 11 and the depths D1 of the crown main grooves 10, for example, are preferably in a range of from 72% to 88% of the thickness t of the tread rubber 2G.

As illustrated in FIG. 3, an inclined middle land portion 21 is defined between a pair of circumferentially adjacent inclined grooves 11 (straight portions 11) in each middle region Mr. In each shoulder region Sr, a shoulder land portion 22 is defined between a pair of circumferentially adjacent arc portions 16 and 16.

Preferably, the middle land portion 21 has a width Wa measured in a direction perpendicular to the straight portions 15 is in a range of from 115% to 165% of the width W2 of the straight portions 15. When the width Wa of the middle land portion 21 is less than 115% of the width W2 of the straight portions 15, dry grip performance when cornering at a small camber angle may be deteriorated due to reduction of the stiffness of the middle land portion 21. On the other hand, when the width Wa of the middle land portion 21 is more than 165% of the width W2 of the straight portions 15, wet performance may be deteriorated due to reduction of groove volume.

The shoulder land portion 22 has a circumferential length L4 increasing toward the tread edge 2t. This gives the shoulder land portion 22 a larger stiffness at the side of the tread edge. Thus, the tire can further improve dry grip performance when cornering at a large camber angle.

The shoulder sub-groove 12 is provided between a pair of circumferentially adjacent inclined grooves 11 and 11 in the shoulder region Sr. The shoulder sub-groove 12 may effectively disperse the water from between the shoulder land portion 22 and the ground.

The shoulder sub-groove 12 has both ends 12e and 12e each of which terminates within the shoulder region Sr. This construction gives the shoulder land portion 22 high stiffness, thereby improving dry grip performance.

The shoulder sub-groove 12 extends in an arc shape along the arc portions 16. That is, the shoulder sub-groove 12 has an angle θ3 increasing radially outwardly with respect to the circumferential direction of the tire. Since the structure suppresses deterioration in rigidity of the shoulder land portion 22, the tire 1 may improve dry grip performance during cornering with a large camber angle. Furthermore, the shoulder sub-groove 12 may smoothly drain the water introduced therein due to lateral force during cornering.

As illustrated in FIG. 1, the shoulder sub-groove 12 preferably has a depth D3 in a range of from 60% to 90% of the depths D1 of the crown main grooves 10, for example.

While the embodiments in accordance with the present invention have been described in detail, the present invention is not limited to the illustrated embodiments, but can be modified and carried out in various aspects.

EXAMPLE

Motorcycle pneumatic tires having a basic tread pattern illustrated in FIG. 1 and a size of 180/155R17 were manufactured based on details shown in Table 1, and then wet and dry performance was tested. The common specifications of tires and test procedures are as follows.

The crown main groove depths: 5.5 mm
The inclined groove depths: 5.5 mm
Ratio W2/TW: 3.0%

Wet and Dry Performance Test:

Each test tire was mounted on a motorcycle having a displacement of 600 cc, and a test rider drove the motorcycle on both dry asphalt test course and an asphalt road partially covered with a 5 mm-depth water to evaluate the performance such as steering response, traction and grip by his feeling. The results are indicated in Table 1 using a score of Ex. 1 being 100. The larger the value, the better the performance is. Note that ten or more point difference in the score means that a remarkable performance difference, was recognized by the test rider, five or more point difference means a clear performance difference was recognized by the test rider, and four or less point difference means that it was difficult to recognize performance difference.

Internal pressure of front and rear tires: 200 kPa
Rim of front wheel: MT5.50
Rim of rear wheel: MT3.50
The test results are shown in Table 1.

TABLE 1

Figure 5:
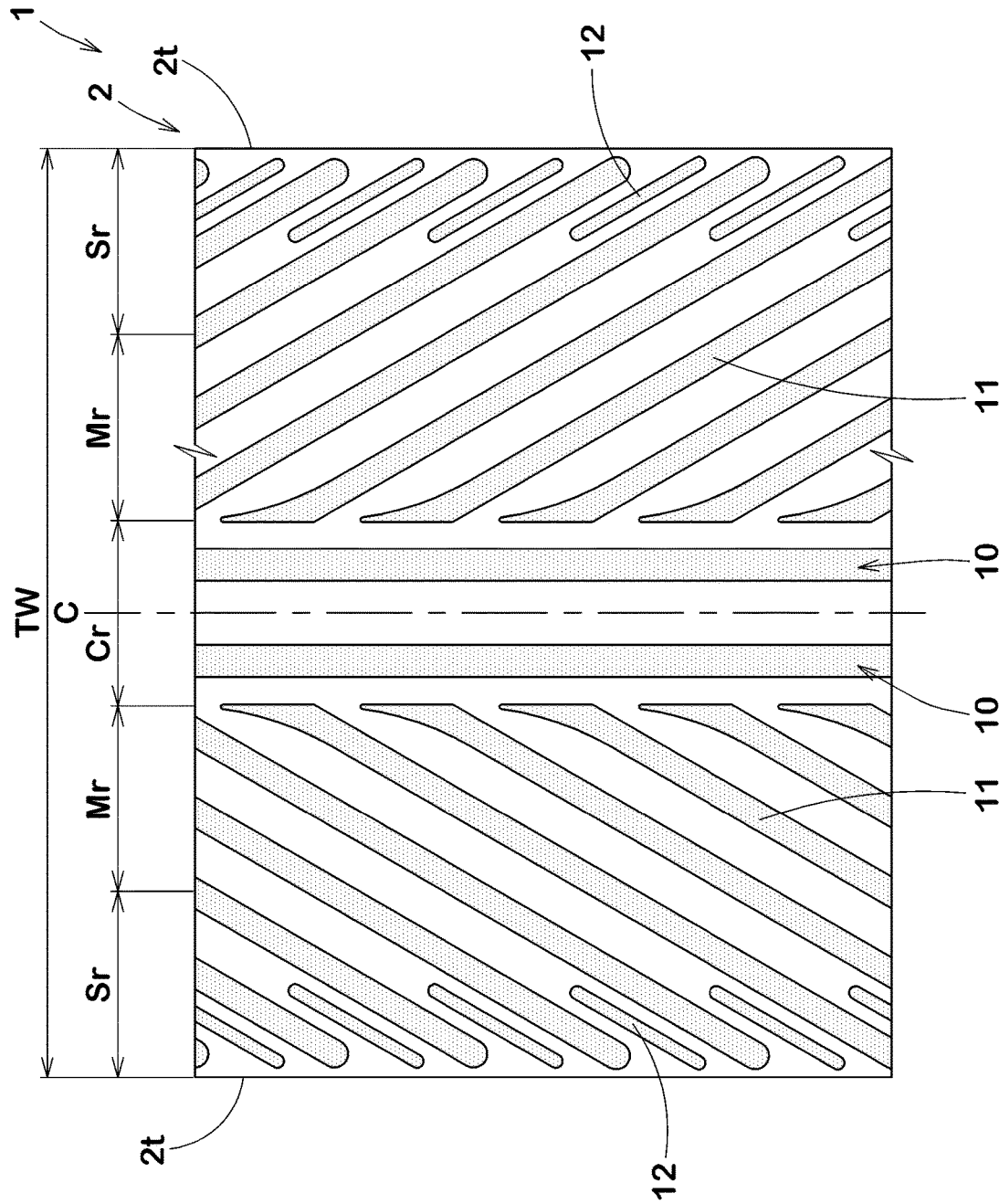
FIG. 5 is a development view of the tread portion of a comparative example.
Figure 6:
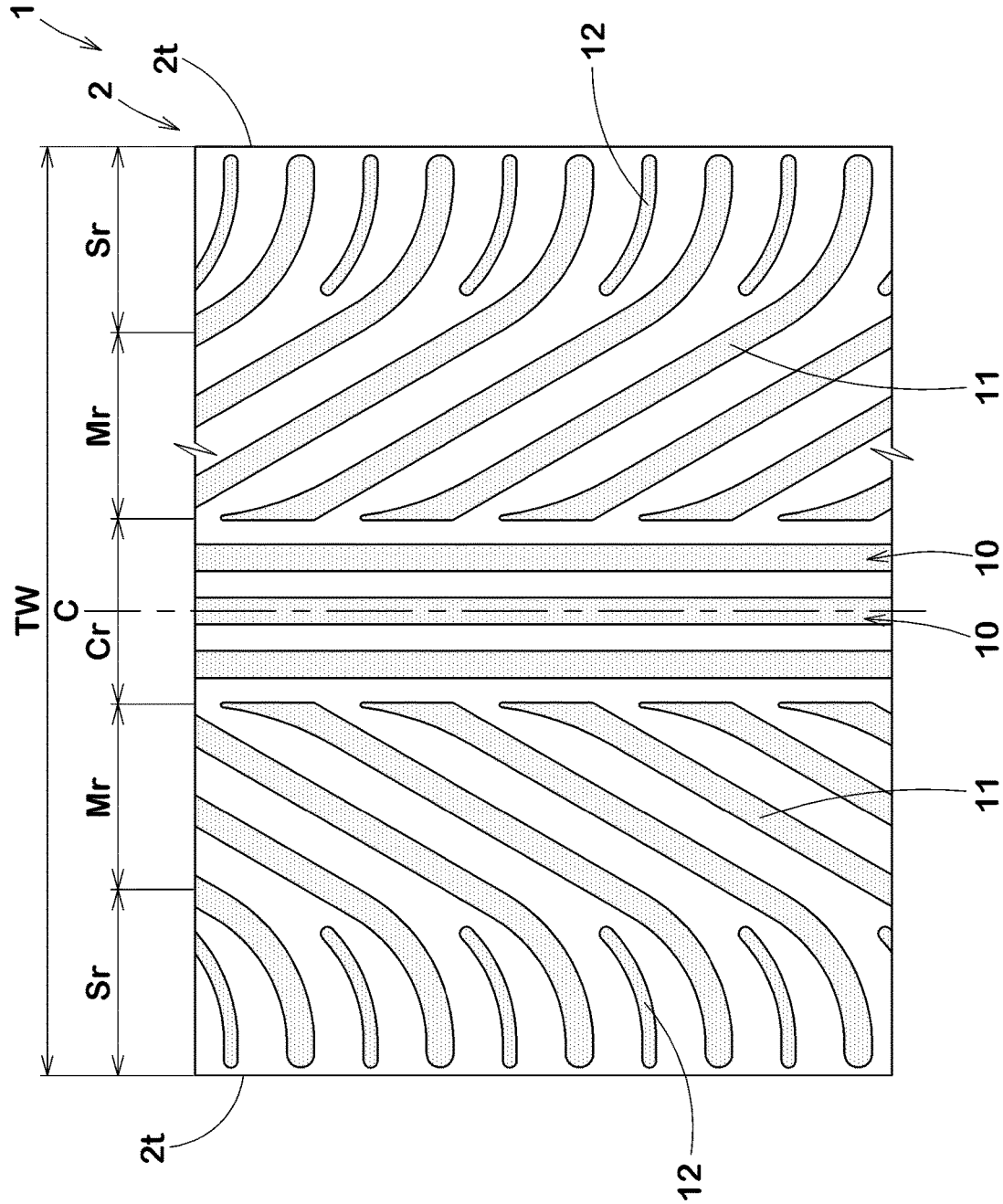
FIG. 6 is a development view of the tread portion of another comparative example.

| Tread pattern | Ref. 1 FIG. 5 | Ref. 2 FIG. 6 | Ex. 1 FIG. 1 | Ex. 2 FIG. 1 | Ex. 3 FIG. 1 | Ex. 4 FIG. 1 | Ex. 5 FIG. 1 | Ex. 6 FIG. 1 | Ex. 7 FIG. 1 | Ex. 8 FIG. 1 |
|---|---|---|---|---|---|---|---|---|---|---|
| Middle land portion width Wa/straight portion groove width W2 (%) | 140 | 140 | 140 | 100 | 115 | 165 | 180 | 140 | 140 | 140 |
| Straight portion angle θ1 (deg.) | 30 | 30 | 30 | 30 | 30 | 30 | 30 | 10 | 20 | 40 |
| Third groove edge length L3/straight portion groove width W2 (%) | 3.4 | 3.4 | 3.4 | 3.4 | 3.4 | 3.4 | 3.4 | 3.4 | 3.4 | 3.4 |
| Distance L1 between crown main groove and inner end of inclined grooves/tread development width TW (%) | 2.5 | 2.0 | 2.5 | 2.5 | 2.5 | 2.5 | 2.5 | 2.5 | 2.5 | 2.5 |
| Wet performance (Score) | | | | | | | | | | |
| Straight traveling | 100 | 100 | 100 | 100 | 100 | 100 | 100 | 100 | 100 | 100 |
| Cornering with small camber angle | 95 | 100 | 100 | 102 | 100 | 98 | 95 | 95 | 98 | 98 |
| Cornering with large camber angle | 90 | 100 | 100 | 102 | 100 | 98 | 95 | 100 | 100 | 100 |
| Dry performance (Score) | | | | | | | | | | |
| Straight traveling | 100 | 85 | 100 | 100 | 100 | 100 | 100 | 100 | 100 | 100 |
| Cornering with small camber angle | 100 | 100 | 100 | 95 | 98 | 100 | 102 | 95 | 98 | 98 |
| Cornering with large camber angle | 90 | 100 | 100 | 95 | 98 | 100 | 102 | 100 | 100 | 100 |

Figure 4:
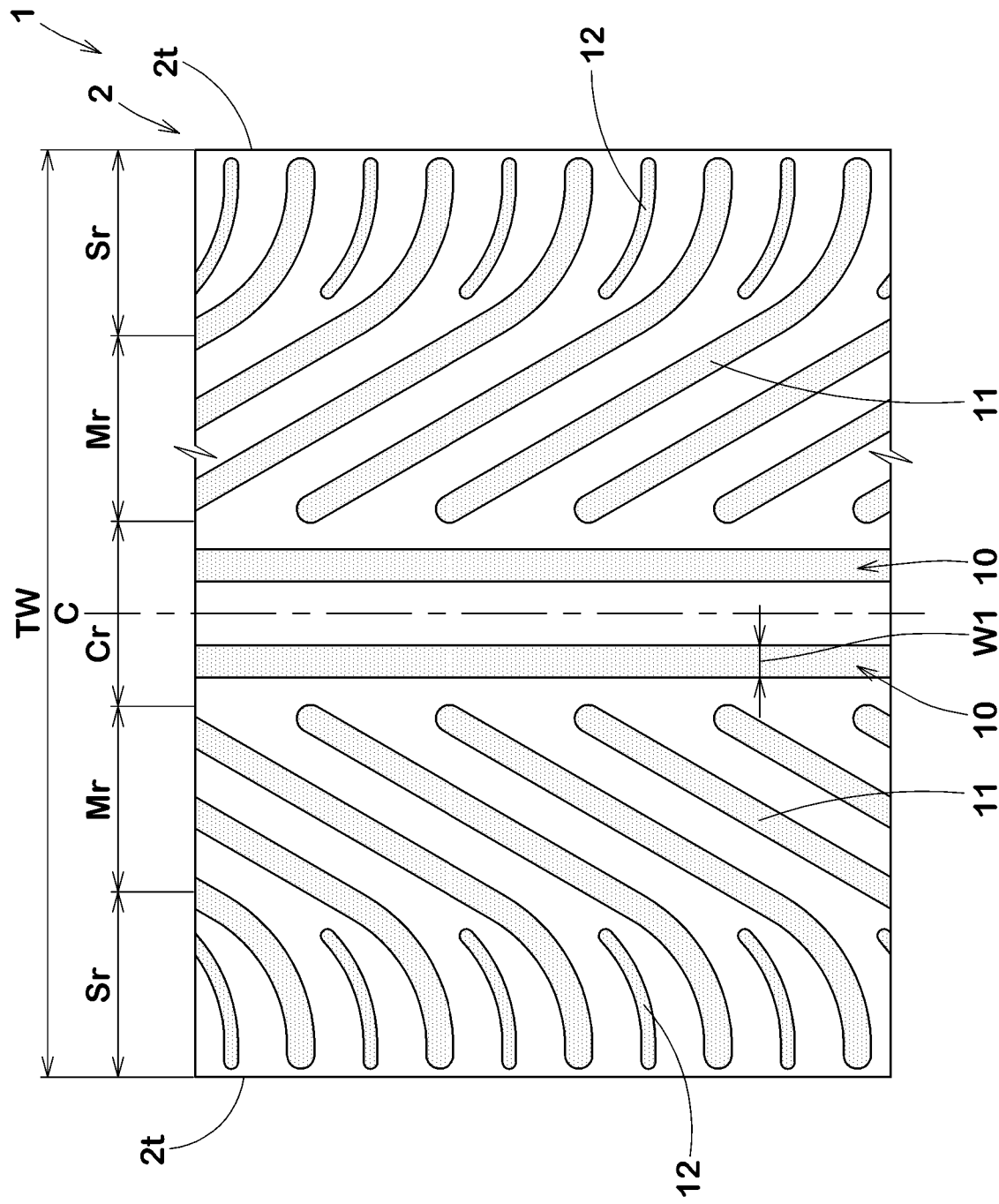
FIG. 4 is a development view of the tread portion in accordance with another embodiment of the invention.

| Tread pattern | Ex. 9 FIG. 1 | Ex. 10 FIG. 4 | Ex. 11 FIG. 1 | Ex. 12 FIG. 1 | Ex. 13 FIG. 1 | Ex. 14 FIG. 1 | Ex. 15 FIG. 1 | Ex. 16 FIG. 1 | Ex. 17 FIG. 1 |
|---|---|---|---|---|---|---|---|---|---|
| Middle land portion width Wa/straight portion groove width W2 (%) | 140 | 140 | 140 | 140 | 140 | 140 | 140 | 140 | 140 |
| Straight portion angle θ1 (deg.) | 50 | 30 | 30 | 30 | 30 | 30 | 30 | 30 | 30 |
| Third groove edge length L3/straight portion groove width W2 (%) | 3.4 | 2 | 2.5 | 4.5 | 4.9 | 3.4 | 3.4 | 3.4 | 3.4 |
| Distance L1 between crown main groove and inner end of inclined grooves/tread development width TW (%) | 2.5 | 2.5 | 2.5 | 2.5 | 2.5 | 0.5 | 1.0 | 4.0 | 5.0 |
| Wet performance (Score) | | | | | | | | | |
| Straight traveling | 100 | 97 | 99 | 100 | 100 | 102 | 100 | 98 | 96 |
| Cornering with small camber angle | 95 | 100 | 100 | 100 | 100 | 100 | 100 | 100 | 100 |
| Cornering with large camber angle | 100 | 100 | 100 | 100 | 100 | 100 | 100 | 100 | 100 |
| Dry performance (Score) | | | | | | | | | |
| Straight traveling | 100 | 98 | 100 | 98 | 95 | 96 | 98 | 100 | 102 |
| Cornering with small camber angle | 95 | 100 | 100 | 100 | 100 | 100 | 100 | 100 | 100 |
| Cornering with large camber angle | 100 | 100 | 100 | 100 | 100 | 100 | 100 | 100 | 100 |

From the test results, it is confirmed that the example tires improve dry and wet performance in good balance, as compared with the reference tire. Although another test using different tire size was conducted, the results had the same tendency of this test results.

What is claimed is:

1. A motorcycle pneumatic tire comprising:
   a tread portion comprising a crown region, a pair of middle regions and a pair of shoulder regions upon a tread development width of the tread portion being divided equally into five regions;
   the tread portion being provided with a pair of circumferentially and continuously extending crown main grooves which extends straight in parallel with a circumferential direction of the tire within the crown region to include a tire equator therebetween, a rib defined between the pair of crown main grooves, and a plurality of inclined grooves each extending from the crown region to the shoulder region in each side of the tire equator without communicating with the crown main grooves, wherein no circumferential groove is provided on the rib; and
   each of the inclined grooves comprising a straight portion extending straightly in the middle region and an arc portion extending in an arc shape in the shoulder region,
   wherein an angle of the arc portion with respect to the circumferential direction of the tire increases from an axially inner side of the arc portion to an axially outer side of the arc portion, and
   a shoulder sub-groove is provided between a pair of circumferentially adjacent inclined grooves in each shoulder region,
   the shoulder sub-groove has both ends terminating within the shoulder region, and
   the shoulder sub-groove has a depth in a range of from 60% to 90% of depths of the crown main grooves,
   wherein the shoulder sub-groove extends in an arc manner along one of the arc portions of the inclined grooves, and wherein the shoulder sub-groove consists of a main portion having a pair of parallelly extending groove edges and two end portions connected to respective groove-longitudinal ends of the main portion, the main portion having a constant groove width, the end portions each having a semi-circular shape such that a groove width of the end portions gradually decreases toward respective ends of the shoulder sub-groove.

2. The motorcycle pneumatic tire according to claim 1, wherein a middle land portion is defined between straight portions of a pair of circumferentially adjacent inclined grooves in each middle region, and a width of the middle land portion in a direction perpendicular to the straight portions is in a range of from 115% to 165% of widths of the straight portions.

3. The motorcycle pneumatic tire according to claim 1, wherein a shoulder land portion is defined between arc portions of a pair of circumferentially adjacent inclined grooves in each the shoulder region, and a circumferential length of the shoulder land portion increases toward a tread edge.

4. The motorcycle pneumatic tire according to claim 1, wherein each of the inclined grooves comprises a first groove edge extending in a straight shape with an inclination, a second groove edge facing the first groove edge and a third groove edge forming the axially inner end of the inclined groove, and the third edge extends in a straight shape along the circumferential direction of the tire.

5. The motorcycle pneumatic tire according to claim 4, wherein the second groove edge intersects with the third groove edge in an acute angle, and an axially inner portion of the second groove edge extends in an arc manner such that an angle of the axially inner portion with respect to the circumferential direction of the tire decreases gradually to the third edge.

6. The motorcycle pneumatic tire according to claim 4, wherein a circumferential length of the third groove edge is greater than a width of the straight portion in each inclined groove.

7. The motorcycle pneumatic tire according to claim 4, wherein a circumferential length of the third groove edge is in a range of from 2.5 to 4.5 times of a width of the straight portion.

8. The motorcycle pneumatic tire according to claim 1, wherein a groove width of the shoulder sub-groove is narrower than that of the inclined grooves.

9. The motorcycle pneumatic tire according to claim 1, wherein a groove width of the shoulder sub-groove is substantially half of that of the inclined grooves.

10. The motorcycle pneumatic tire according to claim 1, wherein the shoulder sub-groove extends in an arc manner along one of the arc portions of the inclined grooves, and a radius of curvature of the shoulder sub-groove is greater than that of the arc portion of each of the inclined grooves.

* * * * *